No. 883,310.

PATENTED MAR. 31, 1908.

E. J. HARRISON.
TROLLEY HARP.
APPLICATION FILED JUNE 10, 1907.

Witnesses:
George Altsch
G. M. Cole.

Edward J. Harrison.
Inventor
By [signature]
Atty.

UNITED STATES PATENT OFFICE.

EDWARD J. HARRISON, OF SOUTH BEND, INDIANA.

TROLLEY-HARP.

No. 883,310.      Specification of Letters Patent.      Patented March 31, 1908.

Application filed June 10, 1907. Serial No. 378,206.

*To all whom it may concern:*

Be it known that I, EDWARD J. HARRISON, a citizen of the United States, residing at South Bend, in the county of St. Joseph and State of Indiana, have invented certain new and useful Improvements in Trolley-Harps, of which the following is a specification.

My invention relates to trolley heads or harps, and more particularly to electrical contact springs therefor, and has for its object to provide a contact spring that will readily conduct the current and serve to hold the trolley wheel true on its spindle and yet permit of yielding movement of the wheel when rounding curves.

A further object resides in providing a contact spring that is detachably secured to the trolley head and that can be readily removed when worn without disassembling the parts of the trolley head.

Figure 1:
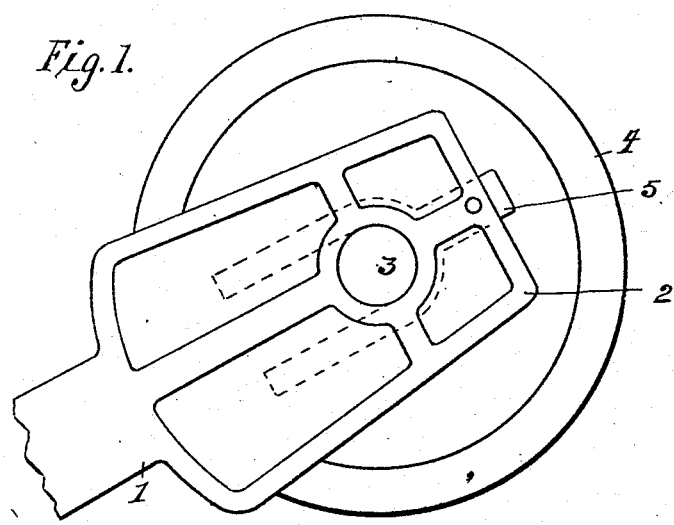
Figure 3:
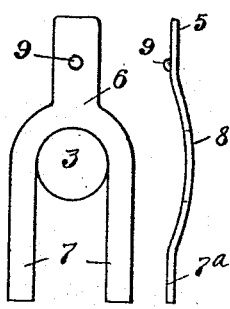
Figure 2:
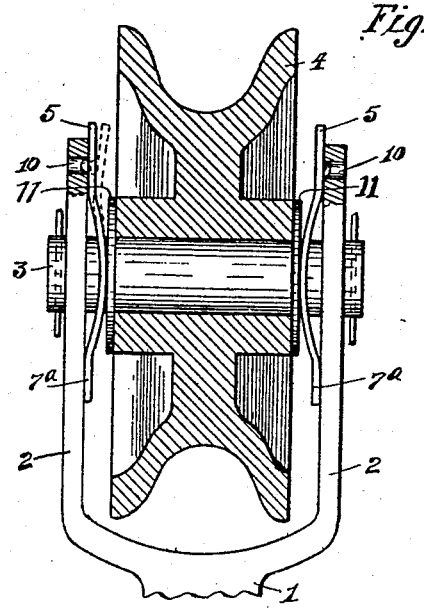

In the drawings:—Figure 1 is a side elevation. Fig. 2 is a vertical section showing the contact springs in position in the head. Fig. 3 are detail views of the contact springs including face and side views.

Referring to the drawings, 1 is the trolley head or harp provided with the forked arms, 2, 2, in which is secured the spindle 3 having the usual grooved wheel 4 mounted thereon. The trolley wheel 4 is of less width than the distance between the forked arms so as to permit the wheel to have some lateral play therebetween. To hold the wheel true on its spindle and out of contact with the arms of the head, I provide contact springs 5. These contact springs are made of thin flexible metal and, as shown in Fig. 3 consist of a main portion 6 terminating in the bifurcated members 7, 7. Intermediate their ends the springs are bowed inwardly, as at 8, this bowed portion beginning at some distance from the end of the main portion 6, terminating short of the ends of the bifurcated members, so as to leave the ends of the spring flat and in the same vertical plane. Near the upper end of each spring is a rounded stud or projection 9 adapted to enter a perforation 10 in the forked arms to hold the spring in place.

The bifurcated members 7, 7 straddle the spindle 3, their flat ends 7ª contacting with the sides of the trolley fork. The bowed portion bears against the hub of the wheel and normally tends to force the same away from the forked arms and out of contact with the latter, while the flat end of the main portion contacts with the upper end of the forked arms and the projection 9 is sprung into the perforation 10 to lock the spring in position.

To provide for easy manipulation of the contact springs, when removing, the main portion 6 is made of sufficient length as to extend beyond the end of the forked arms, whereby a finger portion is provided to enable one to readily spring the projection 9 out of the perforation 10 and unlock the spring.

To preserve the life of the contact springs washers eleven may be interposed between them and the trolley wheel.

It will thus be seen that in applying my contact springs to and removing them from the trolley head, it is not necessary to disassemble any of the parts of the head and when applied they serve to hold the trolley wheel true on the spindle.

What is claimed is:—

1. As an article of manufacture, a contact spring for trolley heads or harps embodying a bowed body portion having one end bifurcated and its opposite end provided with a locking element.

2. In a trolley head, the combination with the wheel and spindle therefor, of a bowed contact spring adapted for slidable movement into straddling engagement with the spindle, the bowed portion bearing against the wheel, and means carried by the spring for engagement with the head to lock the spring against accidental displacement.

3. In a trolley head having spaced arms provided with perforations in the ends thereof, the wheel and spindle therefor, and contact springs adapted to straddle the spindle and bear against the wheel, the contact springs having projections for engagement with the perforations in the arms to lock the springs in position in the head.

4. In a trolley head, the combination with a wheel and spindle therefor, of a contact spring having one end bifurcated to fit the spindle and its opposite end carrying means for engagement with the trolley head to secure the spring against displacement.

In testimony whereof I have signed my name to this specification in the presence of two subscribing witnesses.

EDWARD J. HARRISON.

Witnesses:
    GEORGE OLTSCH,
    G. M. COLE.